United States Patent [19]
Johnson

[11] 3,756,640
[45] Sept. 4, 1973

[54] HANDWHEEL SECURITY LOCK
[75] Inventor: Edwin W. Johnson, Suisun, Calif.
[73] Assignee: General American Transportation Corporation, Chicago, Ill.
[22] Filed: Apr. 28, 1972
[21] Appl. No.: 248,362

[52] U.S. Cl. .......................................... 292/256.75
[51] Int. Cl. ...................... A47j 36/10, B65d 45/16
[58] Field of Search ........................ 292/256, 256.71, 292/256.73, 256.75, 256.6, 256.67; 220/31 R, 31 S, 55 D, 55 E, 55 F, 55 G, 55 E; 16/171; 114/203

[56] References Cited
UNITED STATES PATENTS

| | | | |
|---|---|---|---|
| 2,670,232 | 2/1954 | Schmitz | 292/256.73 |
| 3,666,134 | 5/1972 | Rauch | 292/256.75 |
| 976,974 | 11/1910 | Young | 292/256.75 X |

*Primary Examiner*—Geo. V. Larkin
*Attorney*—Jack L. Prather

[57] ABSTRACT

A handwheel lock particularly designed for use with a hatch cover on a vessel such as a railroad tank car. The apparatus is used with a threaded bolt such as an eyebolt and includes a handwheel assembly which surrounds a nut which is threadedly connected to the bolt. The handwheel includes a pair of spaced apart sets of ratchet teeth and the nut includes a detent arrangement. In one embodiment, a spring is used to bias the handwheel to a position in which the detent on the nut is in engagement with one set of ratchet teeth so that the handwheel can be turned to tighten the nut on the bolt. If the handwheel is turned in the other direction, it will merely ratchet on the nut and torque will not be transmitted to the nut. To loosen the nut, the handwheel must be lifted against the force of the spring so that the detent engages the other set of ratchet teeth to thereby permit the transfer of torque from the handwheel to the nut. In a modified form, springs are used to center a handwheel so that the detent is between a first and second set of ratchet teeth. In order to tighten the nut on the bolt, the handwheel must be pushed down and then rotated. In order to loosen the nut, the handwheel must be lifted and then turned. A simulated lock is positioned in the handwheel to give a visual impression that a key is required to loosen the handwheel.

14 Claims, 8 Drawing Figures

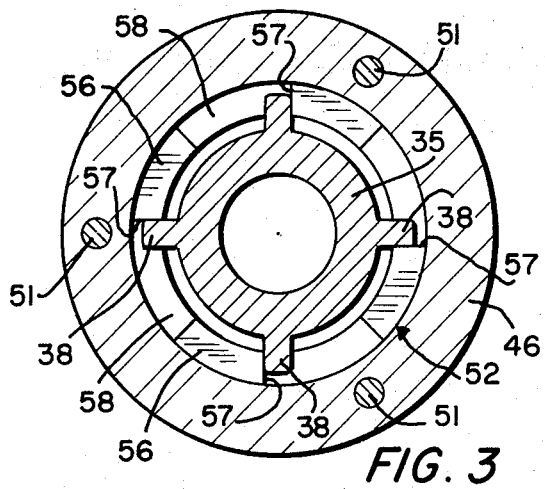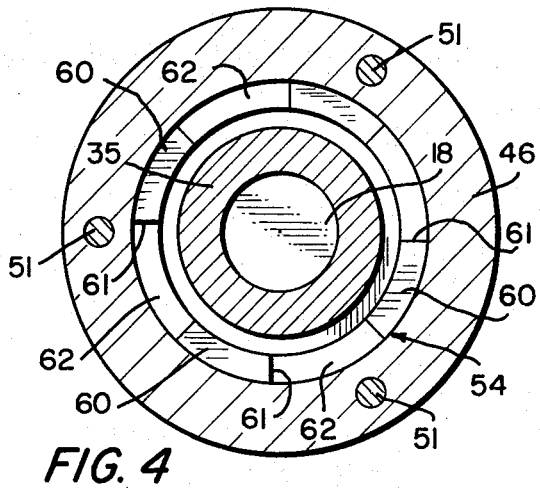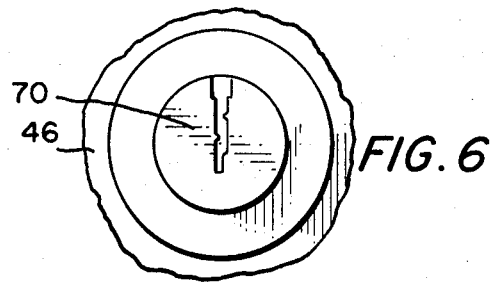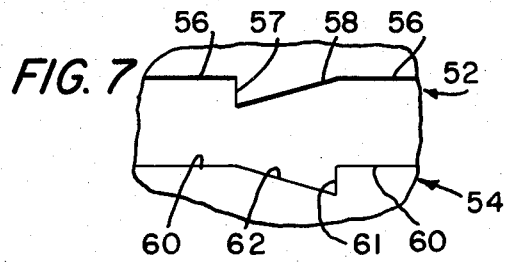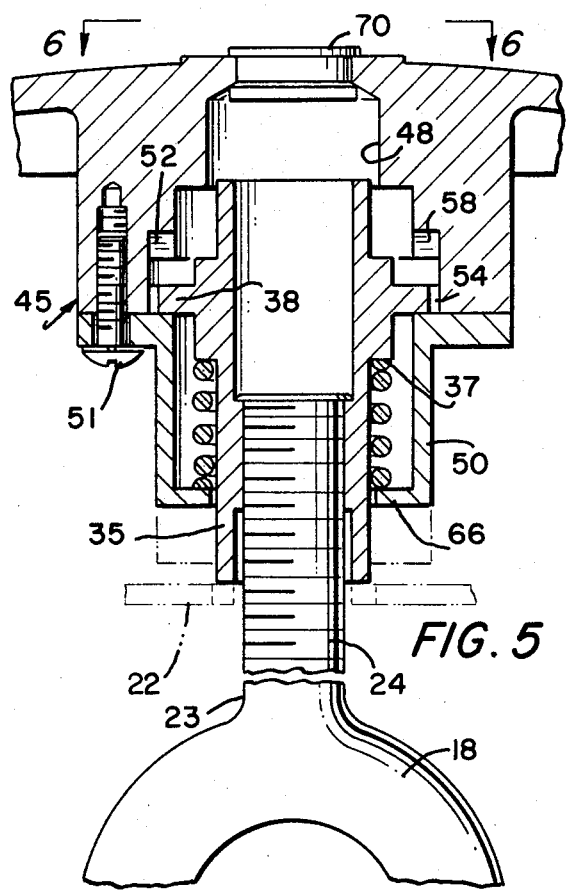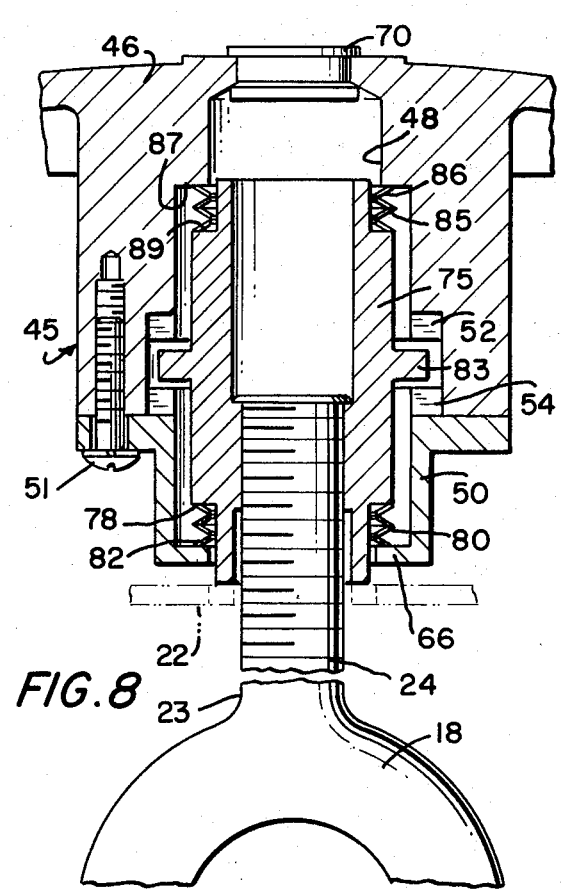

HANDWHEEL SECURITY LOCK

BACKGROUND OF THE INVENTION

This invention relates to a handwheel security lock which is particularly adapted for use in releasably holding a hatch cover in a closed position over an opening such as a manway in a railroad car or other vessel. The invention is designed to confuse people such as vandals who do not know how the handwheel is to be operated to open the hatch cover.

It is conventional practice to provide a plurality of handwheels to releasably secure a cover such as a hatch cover in a closed position over an opening such as a manway in a vessel such as a railroad tank car. Prior to the present invention, it was common practice that an eye-bolt would be pivotally connected either directly to the vessel or to an upstanding tubular member surrounding the vessel opening. The eye-bolt is adapted to fit between a pair of lugs on the hatch cover. A handwheel which is threadedly connected to the bolt is tightened on the eye-bolt by hand to releasably hold the hatch cover in a closed position.

In order to indicate whether a hatch cover has been opened prior to the time that it was intended to be opened, some sort of security fastener is employed. This may consist of a material band which extends through an opening in a handwheel and through a suitable fitting in the hatch cover with a lead or other material seal which must be broken to open the hatch cover. However, these seals merely serve to indicate whether the hatch cover has been opened. They do not serve to prevent the unauthorized opening of the hatch cover.

A security system which requires the use of a key or combination operated lock to open is unsatisfactory for many applications. If such a security lock is used on a hatch cover of a tank car which is to be transported across country, it would be necessary to supply keys or combinations for the locks to all people who would be authorized to open the hatch cover. In view of the large number of railroad cars in existence and the large number of hatch covers associated with such tank cars and the large number of personnel authorized to open the hatch covers, the task of supplying keys to the various authorized people would be impractical. In addition, the possibility of losing keys or the person who is to open the cover not having the proper key available would always be present.

By the present invention, it is intended to provide a handwheel security lock which can be opened and closed without the use of a key or combination but which can only be opened when the person trying to operate the security lock knows the mode of operation of the lock.

SUMMARY

It is, therefore, the principal object of this invention to provide a handwheel assembly for releasably securing a hatch cover to a vessel in a position in which the hatch cover closes an opening in the vessel wherein the handwheel gives the impression of being locked but may be opened without the use of a key or combination.

It is a further object of this invention to provide a fastener assembly for general application to threaded fasteners such as bolts wherein it is desired to simulate a locked fastener but the fastener may be operated without the use of a key or combination.

In general, the foregoing and other objects will be carried out by providing a handwheel assembly for releasably securing a hatch cover to a vessel in a position in which the hatch cover closes an opening in the vessel wherein the hatch cover includes lug means, the handwheel assembly comprising: bolt means pivotally connected to the vessel and including a head and a threaded shank; nut means threadedly connected to said shank whereby the lug on the hatch cover is positioned between the nut means and the head of the bolt means when the hatch cover is in a position in which the hatch cover closes the vessel opening; a handle having a passage therein and surrounding said nut means; hollow cup means surrounding said nut means; means for securing said cup means to said handle to thereby form a hollow handwheel; means operatively associated with said handwheel and said nut means for biasing said handwheel to a position in which said handwheel is free to rotate relative to said nut means and said bolt means in at least one direction; and torque transmitting means operatively associated with said nut means and said handwheel for transmitting torque from said handwheel to said nut means in at least one direction of rotation when a force is exerted on said handwheel in a direction parallel to the longitudinal axis of the nut means to thereby move said handwheel relative to said nut means and torque is applied to said handwheel.

BRIEF DESCRIPTION OF THE DRAWINGS

The invention will be described in connection with the annexed drawings wherein:

FIG. 3 is a sectional view of the handwheel assembly taken on the line 3—3 of FIG. 2 looking in the direction of the arrows;

FIG. 4 is a sectional view of the handwheel assembly taken on the line 4—4 of FIG. 2 looking in the direction of the arrows:

FIG. 5 is a sectional view similar to FIG. 2 but showing the handwheel assembly of the present invention in a different operative position;

FIG. 6 is a fragmentary top view of a portion of the handwheel assembly of the present invention and taken on the line 6—6 of FIG. 5;

FIG. 7 is a diagrammatic view of a portion of the present invention; and

FIG. 8 is a sectional view of a modified handwheel assembly according to the present invention.

DESCRIPTION OF THE PREFERRED EMBODIMENT

Figure 1:
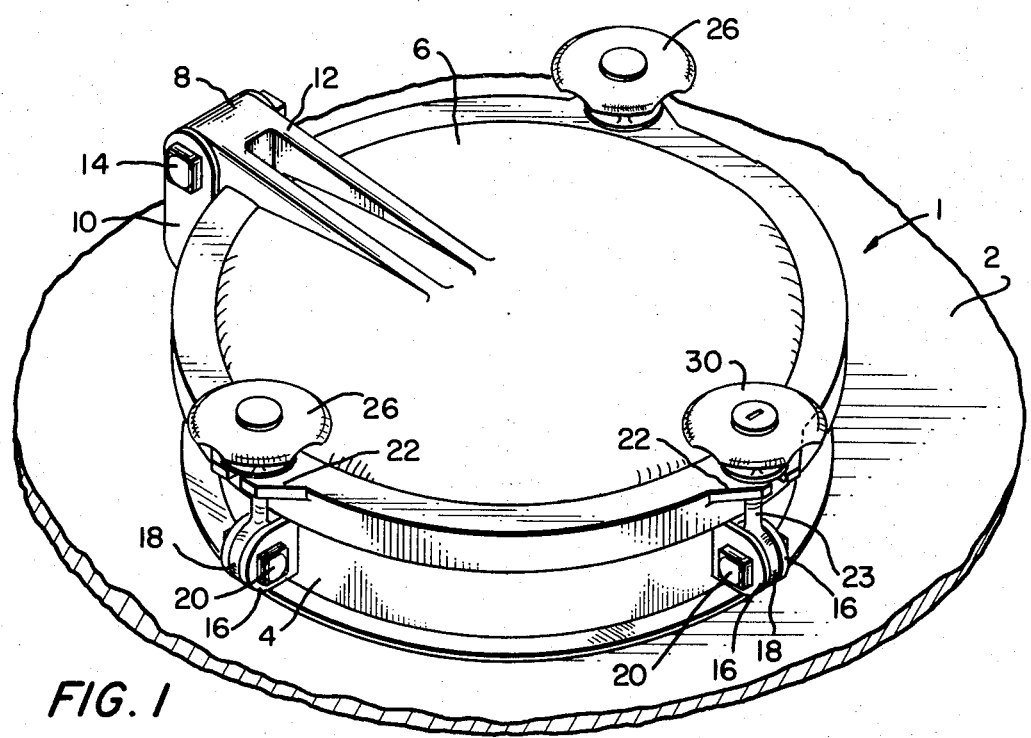
FIG. 1 is a perspective view of a hatch cover assembly employing the present invention.

Referring to the drawing and in particular to FIG. 1, there is shown a hatch cover assembly generally indicated at 1 and a portion of a vessel such as a railroad tank car generally indicated at 2. Although the invention is shown as a handwheel on a hatch cover assembly, it is intended that it may be used as a security fastener for other applications.

The hatch cover assembly may include an upstanding tubular member 4 surrounding an opening in the vessel 2. A hatch cover 6 is pivotally connected to the vessel by means of a hinge 8. The hinge 8 includes a hinge part 10 connected to the vessel or tubular member 4 and hinge part 12 connected to the hatch cover 6. A pivot pin 14 pivotally secures the hinge parts 10 and 12 so that the hatch cover 6 may be pivotally swung between a position which permits access to the vessel opening and a position in which the hatch cover closes the vessel opening as shown in the drawing.

A plurality of pairs of lugs 16 are mounted on the tubular member 4. An eye-bolt 18 is pivotally mounted between the lugs 16 by means of pivot pins 20. The shank of the eye-bolt 18 fits between lugs 22 on the hatch cover 6. The shank 23 of the eye-bolt is suitably threaded as at 24 and handwheels 26 of conventional design are threadedly connected to bolts 18 in two locations to exert a force on the lugs 22 and releasably hold the hatch cover in a closed position. In a third location, a handwheel assembly 30 according to the present invention is used to exert a downward force on the lugs 22 and releasably hold the hatch cover in a closed position.

Figure 2:
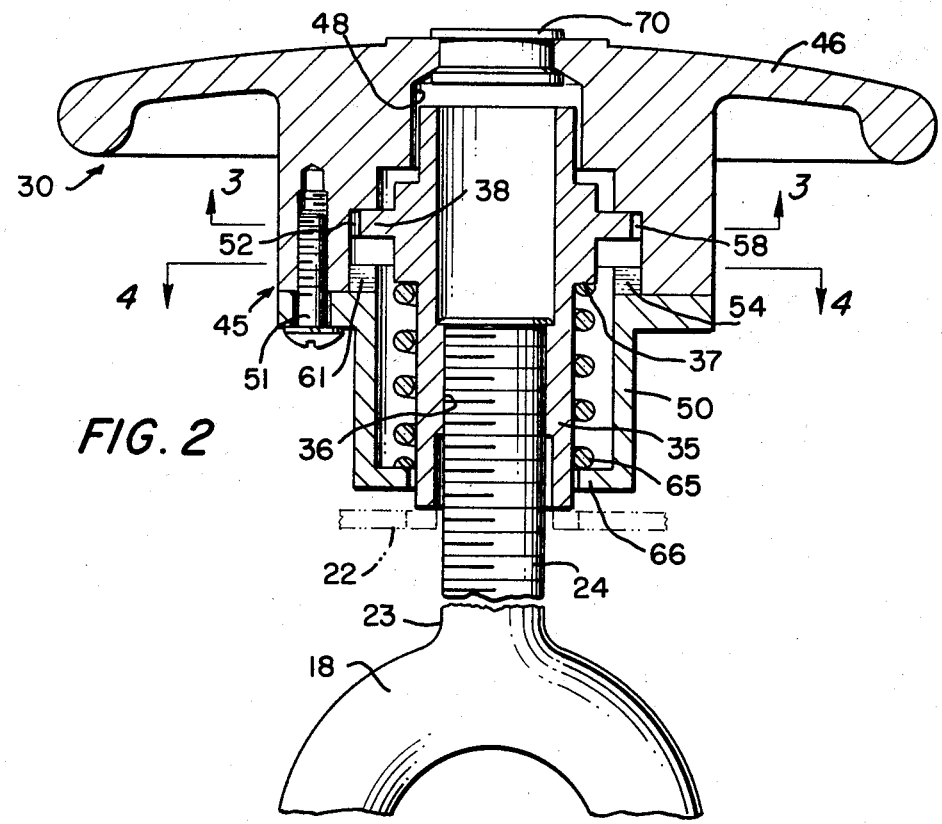
FIG. 2 is a sectional view of a handwheel assembly according to the present invention.

As shown in FIG. 2, the handwheel assembly 30 includes a sleeve or nut means 35 having an internally threaded portion 36 which fits on the threaded portion 24 of the eye-bolt 18. Externally, the nut 35 is dimensioned to form a shoulder 37. Detent means including a plurality of circumferentially spaced apart detents 38 are formed on the outside of the nut 35. The handwheel assembly 30 also includes a hollow handwheel 45. The handwheel 45 is made up of a handle or operative member 46 having a passage 48 therethrough. A hollow cup 50 is secured to the handle 46 by any suitable means such as a screw 51. Both the handle 46 and the cup 50 surround the nut means 35.

The passage 48 is provided with a first set of ratchet teeth 52 which with the detents 38 form a first ratchet means. The cup 50 is provided with a second set of ratchet teeth 54 which are spaced from the first set of ratchet teeth 52 when the cup 50 and handle 46 are joined as shown in FIGS. 2 and 5 and which with the detents 38 form a second ratchet means. The arrangement of the ratchet teeth 52 and 54 is shown diagrammatically in FIG. 7. The first set of ratchet teeth 52 includes a plurality of circumferentially spaced apart raised flats 56 each of which terminates at one end at a shoulder 57. An incline 58 extends from the other end of each flat 56 to the shoulder 57 of the adjacent flat 56. In a similar manner, the second set of ratchet teeth 54 includes spaced apart flats 60 each of which terminates at one end in a shoulder 61. An incline 62 extends from the other end of the flat 60 to the shoulder 61 of the next flat.

The first and second set of ratchet teeth and the detent means together define a torque transmitting means for transmitting torque from the handwheel to the nut means.

In the embodiment shown in FIGS. 2 to 7, the first set of ratchet teeth 52 is designed to transfer rotation of the handwheel 45 to the detents 38 and nut 35 in a clockwise or nut tightening direction of rotation by the shoulders 57 engaging detents 38. If the handwheel 45 is rotated in a counterclockwise or nut loosening direction, the handwheel will ratchet around the nut 35 with the detents 38 riding up the inclines 58.

The second set of ratchet teeth 54 is designed to transfer rotation from the handwheel 45 through the detent 38 to the nut 35 in a counterclockwise direction of rotation with the shoulders 61 engaging the detents 38. In the embodiment shown, when the detents 38 engage the first set of ratchet teeth 52, the handwheel 45 may be turned to tighten the nut 35 on the bolt 18 and when the detents 38 engage the second set of ratchet teeth 54, the handwheel 45 may be turned to loosen the nut 35 from the bolt 18.

A spring 65 extends between a flange 66 on the cup 50 and the shoulder 37 on the nut 35 to bias the handwheel 45 to a position in which the detent 38 engages the first set of ratchet teeth 52. When an upward force is applied to the handwheel 45 in a direction parallel to the longitudinal axis of the nut 35 in an upward direction, the handwheel 45 moves relative to the nut 35 against the biasing force of the spring 65 to the position shown in FIG. 5. In this position, the handwheel moves so that the detent 38 engages the second set of ratchet teeth 54. In this position, the handwheel, when rotated, will transmit a torque through the detent 52 to the nut 45 to permit the nut to be loosened from the bolt 18 and threaded portion 24.

Thus, it will be seen that in the embodiment of FIGS. 2 to 7, if a vandal or other unauthorized person attempts to open the hatch cover, he may loosen the conventional handwheels 26. When he attempts to loosen the handwheel assembly 30, it will merely ratchet and will not loosen unless he applies an upward force to the handwheel 45. A simulated lock and key hole 70 is provided in the top of the handle 46. It is believed that this simulated lock will indicate to the vandal that a key is required to loosen the handwheel assembly 30. This is particularly true when he turns the handwheel and it does not loosen.

In the modified embodiment of FIG. 8, parts similar to those in the embodiment of FIGS. 2 to 7 are indicated by like numerals. In this embodiment, the handwheel 45 is positioned so that its normal position prevents the transfer of torque in either direction of rotation from the handwheel 45 to a nut 75 of slightly different configuration than the nut 35 of FIG. 2. In this embodiment, a first spring means 80 acts between the flange 66 of the cup means 50 and a shoulder 78 on the nut means 75. This first spring means 80 may include a plurality of spring washers such as Belleville washers 82. A second spring means 85 including a plurality of Belleville washers 86 acts between a shoulder 87 in the passage 38 in the handle 36 and a shoulder 89 on the nut 75. The spring means 80 and 85 serve to bias the handwheel 45 to a position in which the detents 38 are positioned between the first set of ratchet teeth 52 and the second set of ratchet teeth 54. In this position, the handwheel 45 can be rotated in either direction and torque is not transmitted to the nut 75. When it is desired to tighten the nut 75 on the bolt 18, a downward force is applied to the handwheel 45 to push the handwheel against the biasing force of the spring 80 so that the detents 38 engage the first set of ratchet teeth 52. If an upward force is applied to the handwheel 45, the handwheel is moved against the biasing force of spring 85 to a position wherein the detents 38 engage the second set of ratchet teeth 54 to permit the transfer of torque from the handwheel through the ratchet teeth 54 to the detent 38 and hence the nut 75 to loosen the handwheel assembly 30 from the bolt 18.

From the foregoing, it should be apparent that the objects of the invention have been carried out. A handwheel assembly particularly adapted for use with hatch covers but which may be applied to other closures, such as a door, has been provided which does not require use of a key or combination to open the handwheel assembly, but simulates a key operated lock. The fastener is easy to remove from the bolt if the operator knows the way in which the apparatus operates. However, one not acquainted with the technique required will have difficulty operating the handwheel. A simulated lock is provided to further confuse the unaware person.

It is intended that the foregoing description be merely that of a preferred embodiment and that the invention be limited solely by that which is within the scope of the appended claims.

I claim:

1. A handwheel assembly for releasably securing a hatch cover to a vessel in a position in which the hatch cover closes an opening in the vessel wherein the hatch cover includes lug means, the handwheel assembly comprising:
   bolt means pivotally connected to the vessel and including a head and a threaded shank;
   nut means threadedly connected to said shank whereby the lug means on the hatch cover is positioned between the nut means and the head of the bolt means when the hatch cover is in a position in which the hatch cover closes the vessel opening;
   a handle having a passage therein and surrounding said nut means;
   hollow cup means surrounding said nut means;
   means for securing said cup means to said handle to thereby form a hollow handwheel;
   means operatively associated with said handwheel and said nut means for biasing said handwheel to a position in which said handwheel is free to rotate relative to said nut means and said bolt means in at least one direction; and
   torque transmitting means operatively associated with said nut means and said handwheel for transmitting torque from said handwheel to said nut means in at least one direction of rotation when a force is exerted on said handwheel in a direction parallel to the longitudinal axis of the nut means to thereby move said handwheel relative to said nut means and torque is applied to said handwheel.

2. A handwheel assembly according to claim 1 wherein said torque transmitting means includes ratchet teeth on the inside of said handwheel; and detent means on said nut means for engaging said ratchet when a force is applied to said handwheel in a direction parallel to the longitudinal axis of the nut means.

3. A handwheel assembly according to claim 1 wherein said torque transmitting means includes a first set of ratchet teeth in the passage in said handle, a second set of ratchet teeth in said cup means spaced from said first set of ratchet teeth; detent means on said nut means for selectively engaging said first and second sets of ratchet teeth; said first set of ratchet teeth being shaped to permit torque to be transmitted from said handwheel to said nut means in one direction of rotation and prevent torque from being transmitted from said handwheel to said nut means in the other direction of rotation; and said second set of ratchet teeth being shaped to permit torque to be transmitted from said handwheel to said nut means in said other direction of rotation and prevent torque from being transmitted from said handwheel to said nut means in said one direction of rotation.

4. A handwheel assembly according to claim 3 wherein said nut means includes a shoulder and said cup means includes a flange; and said means for biasing said handwheel includes spring means between the shoulder of said nut means and the flange of said cup means for normally biasing said handwheel to a position wherein said detent means engages said second set of ratchet teeth whereby when a force is applied to said handwheel in a direction parallel to the longitudinal axis of said nut means and against the biasing force of said spring means, said handwheel moves so that said detent means engages said first set of ratchet teeth.

5. A handwheel assembly according to claim 4 further comprising simulated lock means mounted in said handle.

6. A handwheel assembly according to claim 3 wherein said passage in said handle defines a shoulder, said cup means includes a flange and said nut means includes a pair of shoulders; and said means for biasing said handwheel includes first spring means positioned between the flange of said cup means and one of the shoulders of said nut means, and second spring means positioned between the shoulder in the passage in the handle and the other shoulder of the nut means whereby said first and second spring means cooperate to position said handwheel so that said detent means is located between and out of engagement with said first and second ratchet teeth so that said handwheel is free to rotate in both directions and when a force is applied to said handwheel parallel to the longitudinal axis of the nut means in one direction, said handwheel moves so that said detent means engages said first set of ratchet teeth and when a force is applied to said handwheel parallel to the longitudinal axis of the nut means in the other direction, said handwheel moves so that said detent means engages said second set of ratchet teeth.

7. A security fastener assembly adapted to fit onto a threaded bolt comprising:
   nut means adapted to threadedly fit onto a threaded bolt;
   operative means having a passage therein and surrounding said nut means;
   hollow cup means surrounding the nut means;
   means for securing the cup means to said operative means to thereby form a hollow fastener;
   means operatively associated with said fastener and said nut means for biasing said fastener to a position in which said fastener is free to rotate relative to said nut means in at least one direction; and
   torque transmitting means operatively associated with said nut means and said fastener for transmitting torque from said fastener to said nut means in at least one direction of rotation when a force is exerted on said fastener in a direction parallel to said nut means to thereby move said fastener relative to said nut means and torque is applied to said fastener.

8. A security fastener assembly according to claim 7 wherein said torque transmitting means includes ratchet teeth on the inside of said fastener; and detent means on said nut means for engaging said ratchet teeth when a force is applied to said fastener in a direction parallel to the longitudinal axis of the nut means.

9. A security fastener assembly according to claim 7 wherein said torque transmitting means includes a first set of ratchet teeth in the passage in said operative means, a second set of ratchet teeth in said cup means spaced from said first set of ratchet teeth; detent means on said nut means for selectively engaging said first and second sets of ratchet teeth; said first set of ratchet teeth being shaped to permit torque to be transmitted from said fastener to said nut means in one direction of rotation and prevent torque from being transmitted from said fastener to said nut means in the other direction of rotation; and said second set of ratchet teeth being shaped to permit torque to be transmitted from said fastener to said nut means in said other direction of rotation and prevent torque from being transmitted from said fastener to said nut means in said one direction of rotation.

10. A security fastener according to claim 9 wherein said nut means includes a shoulder and said cup means includes a flange; and said means for biasing said fastener includes spring means between the shoulder of said nut means and the flange of said cup means for normally biasing said fastener to a position wherein said detent means engages said second set of ratchet teeth whereby when a force is applied to said fastener in a direction parallel to the longitudinal axis of said nut means and against the biasing force of said spring means, said fastener moves so that said detent means engages said first set of ratchet teeth.

11. A security fastener according to claim 9 wherein said passage in said operative means defines a shoulder, said cup means includes a flange and said nut means includes a pair of shoulders; and said means for biasing said fastener includes first spring means positioned between the flange of said cup means and one of the shoulders of said nut means and second spring means positioned between the shoulder in the passage in the handle and the other shoulder of the nut means whereby said first and second spring means cooperate to position said fastener so that said detent means is located between and out of engagement with said first and second sets of ratchet teeth so that said fastener is free to rotate in both directions and when a force is applied to said fastener parallel to the longitudinal axis of the nut means in one direction, said fastener moves so that said detent means engages said first set of ratchet teeth and when a force is applied to said fastener parallel to the longitudinal axis of the nut means in the other direction, said fastener moves so that said detent means engages said second set of ratchet teeth.

12. A handwheel assembly for releasably securing a hatch cover to a vessel in a position in which the hatch cover closes an opening in a vessel wherein the hatch cover includes lug means, the handwheel assembly comprising:
threaded bolt means pivotally connected to the vessel;
nut means threadedly engaging the bolt means and bearing against the lug means on the hatch cover;
a handwheel operatively associated with the nut means;
first ratchet means operatively associated with the handwheel and the nut means for transmitting torque from the handwheel to the nut means in a loosening direction upon engagement;
second ratchet means operatively associated with the handwheel and the nut means for transmitting torque from the handwheel to the nut means in a tightening direction when engaged; and
biasing means resisting engagement of the first ratchet means.

13. A handwheel assembly for releasably securing a hatch cover to a vessel in a position in which the hatch cover closes an opening in a vessel wherein the hatch cover includes lug means, the handwheel assembly comprising:
bolt means pivotally connected to the vessel including a head and a threaded shank;
nut means threadedly connected to the shank whereby the lug means on the hatch cover is positioned between the nut means and the head of the bolt means when the hatch cover is in a position in which the hatch cover closes the vessel opening;
a handwheel operatively associated with said nut means;
means operatively associated with said handwheel for biasing said handwheel to a position in which said handwheel is free to rotate in a nut loosening direction;
first ratchet means operatively associated with said handwheel and said nut means for transmitting torque from said handwheel to said nut means in a nut loosening direction; and
second ratchet means operatively associated with said handwheel and said nut means for transmitting torque from said handwheel to said nut means in a nut tightening direction when a force is exerted on said handwheel in a direction parallel to the longitudinal axis of said nut means.

14. A handwheel assembly for releasably securing a hatch cover to a vessel in a position in which the hatch cover closes an opening in a vessel wherein the hatch cover includes lug means, the handwheel assembly comprising:
bolt means pivotally connected to the vessel including a head and a threaded shank;
nut means threadedly connected to the shank whereby the lug means on the hatch cover is positioned between the nut means and the head of the bolt means when the hatch cover is in a position in which the hatch cover closes the vessel opening;
a handwheel operatively associated with the nut means;
means operatively associated with the handwheel for biasing the handwheel to a position in which the handwheel is free to rotate relative to said nut means in both directions;
first ratchet means operatively associated with said handwheel and said nut means for transmitting torque from said handwheel to said nut means in a nut loosening direction, when engaged; and
second ratchet means operatively associated with said handwheel and said nut means for transmitting torque from said handwheel to said nut means in a nut tightening direction when engaged whereby when a force is applied to said handwheel in one direction parallel to said nut means, said first ratchet means is engaged and when a force is applied to said handwheel in the other direction parallel to said nut means, the second ratchet means is engaged.

* * * * *